United States Patent
Kamigata et al.

[11] Patent Number: 5,881,353
[45] Date of Patent: Mar. 9, 1999

[54] METHOD FOR PRODUCING POROUS BODIES

[75] Inventors: Yasuo Kamigata; Takeshi Yoshida; Kenzo Susa, all of Tsukuba; Tatsuya Uchida; Hatsue Hiratsuka, both of Shimodate, all of Japan

[73] Assignee: Hitachi Chemical Company, Ltd., Tokyo, Japan

[21] Appl. No.: 722,249

[22] PCT Filed: Aug. 11, 1994

[86] PCT No.: PCT/JP94/01337

§ 371 Date: Sep. 30, 1996

§ 102(e) Date: Sep. 30, 1996

[87] PCT Pub. No.: WO95/26844

PCT Pub. Date: Oct. 12, 1995

[30] Foreign Application Priority Data

Mar. 31, 1994 [JP] Japan .................................. 6-061872
Mar. 31, 1994 [JP] Japan .................................. 6-062840

[51] Int. Cl.$^6$ ...................................................... B22F 3/10
[52] U.S. Cl. .................................................. 419/2; 501/80
[58] Field of Search .................................. 919/2; 501/80

[56] References Cited

U.S. PATENT DOCUMENTS

| | | | |
|---|---|---|---|
| 3,111,396 | 11/1963 | Ball | 419/2 |
| 3,408,180 | 10/1968 | Winkler | 419/2 |
| 4,729,871 | 3/1988 | Morimoto | 419/2 |
| 5,531,955 | 7/1996 | Sugikawa | 419/2 |
| 5,640,669 | 6/1997 | Harada et al. | 428/552 |

FOREIGN PATENT DOCUMENTS

| | | |
|---|---|---|
| 47-10524 | 3/1972 | Japan . |
| 58-204137 | 11/1983 | Japan . |
| 61-53417 | 11/1986 | Japan . |
| 62-269724 | 11/1987 | Japan . |
| 3-188203 | 8/1991 | Japan . |
| 4-59902 | 2/1992 | Japan . |
| 5-287329 | 11/1993 | Japan . |

Primary Examiner—Ngoclan Mai
Attorney, Agent, or Firm—Pennie & Edmonds LLP

[57] ABSTRACT

A method for producing a porous body with high porosity is provided.

An adhesive is coated on a synthetic resin foam having three-dimensional network structure, such as urethane foam, serving as a base material, to impart stickiness to the surface of the resin foam, and thereafter a powder such as copper oxide powder is applied thereto, followed by heating to remove the substrate and sinter the powder. Thus, a porous body to which the pattern of the base material has been transferred is produced.

The powder may be appropriately selected to obtain porous bodies having a great strength, without limitations on materials.

18 Claims, 1 Drawing Sheet

METHOD FOR PRODUCING POROUS BODIES

TECHNICAL FIELD

This invention relates to a method for producing porous bodies formed of metals or ceramics, used in filters, catalyst carriers, cell current collectors, heat exchange members of heat exchange pipes, and so forth.

BACKGROUND ART

Methods for producing porous bodies include metal plating and powder slurry impregnation coating. The metal plating is disclosed in Japanese Patent Publication (KOKOKU) No. 47-10524, and is a method in which a synthetic resin foam having a three-dimensional network structure as exemplified by urethane foam is subjected to conductive treatment with carbon or the like, followed by electrodeposition of a metal layer of nickel or the like in a plating bath and further followed by firing to decompose and burn off the resin, to obtain an electrodeposited-metal porous body to which the pattern of foamed resin has been transferred.

The powder slurry impregnation coating is disclosed in Japanese Patent Publication (KOKOKU) No. 61-53417, and is a method in which a synthetic resin foam having a three-dimensional network structure as exemplified by urethane foam is immersed in a slurry prepared by mixing a metal powder, a thickening polymer and a solvent, to apply the metal powder to the framework of the foam, followed by heating to decompose and burn off the resin and sinter the metal powder, to obtain a metal porous body to which the pattern of foamed resin has been transferred.

According to the powder slurry impregnation coating, as disclosed in Japanese Patent Application Laid-open (KOKAI) No. 62-269724, a porous body can also be obtained on a non-conductive material such as ceramics by a similar method.

The metal plating is currently used as a practical method, although it requires complicated steps when the metal is plated on insulating materials such as foamed resins. For example, it requires conducting treatment or seeder treatment as pretreatment. Also, this method can not obtain a porous body formed of non-conductive substances such as ceramics and a porous body formed of alloys of two or more metals, and has the problem that materials for porous bodies are limited to some metals feasible for plating, such as nickel and copper.

The slurry coating is commonly a method in which a powder is suspended in a solution of a polymeric organic material to form a slurry and a base material is impregnated with it, and has the problem that the powder may settle unless the slurry is well stirred, and on the other hand bubbles may be held therein if excessively stirred, making it cumbersome to manage slurries. This method has an advantage that materials having no conductivity as exemplified by ceramics can be formed into the product so long as they are powdery, without limitation to metals. However, because of surface tension of the slurry, the powder tends to gather at joints in the framework of the base material rather than the framework itself, and it is difficult for the powder to be uniformly soaked in and applied to the base material. This phenomenon greatly affects the strength of the resulting porous body. That is, when the powder is applied in a certain quantity, the framework may be thinly formed and have a low strength. Accordingly, in order to make the framework thick, a precaution is taken in which the slurry for impregnation coating is used in a large quantity to ensure the strength.

As an additional problem, the above method has a disadvantage that thin filmy portions (closed portions) that close up the network structure of the base material tend to be produced. This is a phenomenon that may occur because the slurry tend to form a film, and depends on the viscosity of the slurry. Even when polymers in the slurry are removed so that the base material is impregnated with a mixture of powder and solvent, powder particles may agglomerate in the course of drying to cause such closed portions.

DISCLOSURE OF THE INVENTION

The present invention provides a novel method for producing a porous body free of dependence on materials, having a great strength, having less closed portions and having a good air permeability.

The present invention is a method for producing a porous body, comprising applying a powder to the surface of the framework of a three-dimensional network structure serving as a base material, followed by heating. More specifically, the powder is directly applied to the surface of the base material by a dry process.

The three-dimensional network structure serving as the base material may include foamed resins having an open-cell structure, nonwoven fabric, woven fabric, paper or the like, and the shape thereof may be appropriately selected according to the purpose. Net-like articles, stripe-like articles, and cloth-like articles are used. Materials therefor are not limited to combustible materials such as resin, and metals or ceramics may be used. When a non-combustible base material is used, the base material serves as a support of the porous body.

There are no limitations on the shape of the three-dimensional network structure, which may be of any shape including a sheet, a block, a pipe, or the like. The density of networks may be changed as desired, for each structure. Such a shape depends on the shape of the base material. When the base material can not be molded into the desired shape in one step, the base material may be joined in advance. For example, in the case of urethane foam, it can be thermally fused with ease. The base material may be previously joined to metal foil or a metal block, whereby a structural material having good heat conduction can be produced.

Stickiness may preferably be imparted to the framework surface of the base material, in order to make it easy to apply the powder and to prevent the powder from coming off. The stickiness can be imparted by coating the surface with an adhesive solution of an acrylic type or a rubber type, or a solution of an adherent resin such as phenol resin, epoxy resin or furan resin. In the case of a resin base material, the stickiness can be imparted to the base material itself by plasma treatment or the like.

After the stickiness has been imparted to the framework surface of the base material preferably, the powder is applied to the framework surface by a method in which, e.g., the base material is shaken in the powder or the powder is sprayed on the base material. This makes it possible to directly apply the powder in a dry state to the surface of the base material. The powder is instantaneously fixed to the base material surface, and the powder does not move at all from the base material surface in the course of drying as it does in the slurry coating. Hence, the powder does not gather at all at the joints of the framework of the base material. Also, the powder is applied to the base material surface and fixed there without dependence on the thickness of the adherent layer. Hence, the powder can be applied in a uniform weight over the whole area of the base material, so that when the powder is applied in a certain weight, a porous body having a great strength can be obtained. Moreover, the powder is selectively applied only to the portions where the stickiness has been imparted and also no solvent is used. Hence, powder particles do not agglomerate, and the closed portions are not formed at all as they do in the slurry coating.

The powder may be made of any materials without limitation to metals, ceramics, carbons and so forth. Mixtures of some of these may also be used. The powder may have any particle diameters so long as it can be applied to the base material surface, and preferably within the range of from 0.01 micron to 100 microns. There are no particular limitations on the form of the powder. The powder applied forms coat layers, and the powder may be partially discontinuous depending on use.

As the powder, nickel powder, copper oxide powder, copper powder or the like is used. The powder may be selected from a wide range of materials in accordance with the purpose for which the porous body to be produced is used.

In the case when the powder used is made of copper, cupreous metal may be used. Since fine copper powder is a hazardous material, compounds such as copper oxide and copper sulfide are preferred. In particular, copper oxide can be readily produced from copper etching waste liquid discarded in large quantities during the manufacture of printed wiring boards, and is preferred as being inexpensive and also from the viewpoint of resource circulation. Such powder may also have any particle diameters so long as it can be applied to the base material surface, and preferably within the range of from 0.01 micron to 100 microns. There are no particular limitations on the form of the powder. According to purposes, other metal or metal compound may also be mixed in the same powder or as an additional powder in an amount as intended.

Pulp containing metal powder such as copper oxide powder may be made into paper, whereby the metal powder such as copper oxide powder can be applied to the surfaces of pulp fibers.

After the powder has been applied to the base material, heating is carried out. The heating is chiefly for the purpose of sintering the powder. In the case when a combustible base material such as foamed resin is used as the base material, the base material is decomposed and removed because the decomposition temperature of the resin is commonly lower than the sintering temperature for the powder. With regard to heating conditions, treatment temperature, time, and atmosphere may be appropriately selected in accordance with the properties of the base material and powder to be used. The heating to decompose and remove the base material may preferably be carried out at a temperature of from 200° C. to 800° C. in the case when the base material is a combustible resin such as urethane resin. The sintering of the powder may preferably be carried out at a temperature of from 600° C. to 1,400° C. in the case of metal powders such as nickel powder, copper oxide powder and copper powder, and at a temperature of from 1,200° C. to 2,000° C. in the case of ceramics.

In the case when a material which is burnt off upon heating, such as foamed resin, is used as the base material, and the metal is used as the powder material, the heating and sintering may preferably be carried out in different atmospheres such that the base material is burnt off in an oxidizing atmosphere, and the metal powder is sintered in a reducing atmosphere. In the case when oxide ceramic or platinum powder is used as the powder, there is no problem of oxidation, and hence the heating may be carried out in an oxidizing atmosphere.

In place of the sintering of metal powder in a reducing atmosphere, a reducing agent may be previously be added to the powder and/or the base material so that the sintering is carried out in an oxidizing atmosphere or in an inert atmosphere.

As the reducing agent, carbon, paper, hydrocarbon compounds, sulfur, sulfides, phosphor, hydrides ($NaHCO_3$, $NaBH_4$, etc.) and so forth may be used.

As the inert atmosphere, atmospheres of nitrogen and of inert gases such as argon, helium, krypton and xenon may be used.

The porous body thus sintered may be treated and reduced with a liquid reducing agent (e.g., alcohol, aldehyde, saccharide or solution of $NaBH_4$ etc.) to obtain a metal porous body.

The step of imparting stickiness and the step of applying the powder may be repeated to thereby obtain a porous body having any desired framework thickness.

After the powder has been applied and before the heating is carried out, the powder having been applied to the base material may be wetted with a liquid and thereafter dried. This makes it possible to densely apply the powder to the framework of the base material. Hence, a porous body having a greater strength can be obtained after the heating. This is a method in which the powder present on the base material surface is wetted with a liquid so as to agglomerate powder particles by the aid of surface tension of the liquid in the course of drying. The powder may be wetted by immersing the base material in a liquid, or by spraying a liquid on the base material. The liquid may be of any kind so long as it is a material that may cause no lowering of the adhesion between the base material and the powder. Water is most practical. A binder comprised of a polymer having thickening properties, such as methyl cellulose or polyvinyl alcohol may be added to this liquid, whereby the strength after firing can be further improved.

A solution containing a metal salt may be used as the liquid with which the powder is wetted, whereby the strength of powder layers formed after the combustible base material has been decomposed and burnt off in the heating step and before the powder is sintered can be further improved so as to cause neither buckling nor breaking, making it possible to maintain the shape of the base material.

The metal salt may be any of those capable of being dissolved in the liquid. Those capable of forming oxides around the temperature at which the base material is decomposed and removed are preferred because of their greater effect on the improvement in strength. Accordingly, organic salts such as nitrates, acetates and formates are preferred, which form oxides at 500° C. or below at which combustible base materials commonly available undergo decomposition. The metal salt may be either of a type that contains metal ions of the same type as those of the powder, or of a type that contains metal ions of different types. In the case when it contains metal ions of different types, a metal porous body comprised of an alloy or complex compound can be readily obtained. Use of an aqueous solution containing copper ions enables improvement in strength of a cooper porous body produced. Use of a solution containing cobalt or chromium enables control of conductivity and thermal expansion coefficient.

The metal salt solution may preferably be in a concentration of not less than 0.01 mol/l in order for its use to be effective. The upper limit of the concentration may be saturation. It may particularly preferably be in a concentration of from 0.1 to 2 mol/l. The amount of the metal salt added in the powder can be controlled by adjusting the concentration of the metal salt solution and how many times the immersion or spraying is repeated.

When the base material to which the powder has been applied is wetted with the liquid containing a metal salt, followed by drying, the strength obtained after the base material has been decomposed and burnt off in the heating step and before the powder is sintered can be improved, so that neither buckling nor breaking may occur, making it possible to maintain the shape of the base material. When the powder having been applied to the base material surface is wetted with the liquid containing a metal salt, it brings about the effect of agglomerating powder particles by the aid of surface tension of the liquid in the course of drying, and also the function that the metal salt having adhered to the surfaces of powder particles acts as a binder. Hence, this can increase the power to increase the strength after the base material, whose strength becomes lowest in the course of production, has been decomposed and burnt off and before the powder is sintered, and to thereby maintain the shape. Hence, when base materials having the shape of, e.g., blocks, having a thickness in the height direction, are used, the powder can be sintered without causing buckling, and when sheet-like base materials are used, breaking can be prevented from occurring.

An oxide film may be formed on the surface of a metal porous body obtained after sintering. Heat exchange efficiency can be thereby improved in cases where the metal porous body is used as a heat exchange member. The case where the metal porous body is used as a heat exchange member refers to, e.g., a case where a layer of the metal porous body of the present invention is fused to the periphery of a copper pipe through the inside of which a medium flows.

The oxide film can be formed by, e.g., firing the porous body in an oxidizing atmosphere as in the air or in an ozone atmosphere, oxidizing it in an oxidative solution of $NaClO_2$, $NaClO_3$, a persulfate (e.g., potassium, sodium or ammonium persulfate), potassium permanganate or the like, heating it in a solution of sodium hydroxide, or igniting it in the presence of water.

BEST MODE FOR WORKING THE INVENTION

Example 1

As the base material having a three-dimensional network structure, a polyurethane foam (trade name: EVERLITE SF, available from Bridgestone Corporation) was used. This polyurethane foam was immersed in an acrylic type adhesive solution with a resin content of 5%, prepared using methyl ethyl ketone as a solvent, and thereafter passed through rollers to remove the excess solution, whereby the adhesive was coated to impart stickiness to the surface of the framework of the base material. The resulting base material was dried at 100° C. for 10 minutes to remove the solvent, and thereafter inserted into nickel powder and shaken therein to apply the nickel powder to the base material. Thereafter, the base material with the powder was kept at 500° C. for 10 minutes in the atmosphere to decompose and remove the base material polyurethane foam. Subsequently, the product was kept at 1,200° C. for 20 minutes in a reducing atmosphere with hydrogen gas flow. As a result, the nickel powder was sintered, and a nickel porous body (a) of 2.1 mm thick was obtained, having such a form that the pattern of polyurethane foam was transferred. Its porosity was 96%.

Comparative Example

Using exactly the same polyurethane foam as used in Example 1, the polyurethane foam was immersed in and coated with a nickel powder slurry prepared by mixing the following composition by means of a ball mill for 30 minutes, followed by removal of the excess nickel powder slurry. The polyurethane foam with the slurry was dried at 100° C. for 30 minutes, and thereafter kept at 500° C. for 10 minutes in the atmosphere to decompose and remove the polyurethane foam. Subsequently, the product was kept at 1,200° C. for 20 minutes in a reducing atmosphere with hydrogen gas flow. As a result, the nickel powder was sintered, and a nickel porous body (c) of 2.1 mm thick was obtained, having such a form that the pattern of polyurethane foam was transferred. Its porosity was 96%.

Slurry composition:

| Powder (nickel powder) | 50% by weight |
| Binder (methyl cellulose) | 2% by weight |
| Water | 48% by weight |

The relationship between tensile stress and elongation of each of the nickel porous bodies (a), (b) and (c) obtained in Examples 1 and 2 and Comparative Example is shown in FIG. 1. In the drawing, the ends of curves indicate points of rupture. In the porous bodies of Examples 1 and 2, their tensile strength is improved to at least twice that of the porous body produced in a Comparative Example. Thus, as is seen therefrom, a porous body having a great strength can be obtained according to the present invention, compared with the method of coating the powder slurry. In comparison between Examples 1 and 2, Example 2 shows a tensile strength higher by about 20%. Thus, as is seen therefrom, the strength is improved when the powder is wefted with a liquid after it has been adhered to the base material.

The nickel porous bodies obtained in Example 1 and Comparative Example were compared on surface profile observation photographs taken with a scanning electron microscope. As a result, the porous body obtained in Example 1 had a framework with a uniform thickness compared with the porous body obtained in Comparative Example. It is considered that, in the present invention, a product having less minute defects and having a higher strength than in the slurry coating can be obtained.

The porous body obtained in Comparative Example has many closed portions, whereas the porous body obtained in the present invention has no closed portions, has a good air permeability, and can promise a smaller pressure loss when used in filters or the like.

Example 3

The same polyurethane foam as in Example 1 was used. This polyurethane foam was immersed in the acrylic type adhesive solution with a resin content of 5%, whereby the adhesive was coated to impart stickiness to the surface of the framework of the base material. The resulting base material was dried at 100° C. for 10 minutes, and thereafter zinc oxide was applied to the base material. Thereafter, the base material with the powder was kept at 1,300° C. for 2 hours in an oxidizing atmosphere in air. As the result, the zinc oxide powder was sintered, and a zinc oxide porous body was obtained, having such a form that the pattern of polyurethane foam was transferred. This porous body was reduced for 1 hour in a 1,000° C., hydrogen-containing atmosphere to obtain a porous body of a ZnO:Zn phosphor. This structural material was exposed to ultraviolet rays. As a result, the ultraviolet rays reached the inner part of the porous body, having a large surface area, so that blue green uniform emission was obtained in a high efficiency.

Example 4

As the base material having a three-dimensional network structure, a polyurethane foam (trade name: EVERLITE SF, available from Bridgestone Corporation) was used. This polyurethane foam was immersed in an acrylic type adhesive solution with a resin content of 5%, prepared using methyl ethyl ketone as a solvent, and thereafter passed through rollers to remove the excess solution, whereby the adhesive was coated to impart stickiness to the surface of the framework of the base material. The resulting base material was dried at 100° C. for 10 minutes to remove the solvent, and thereafter inserted into copper oxide powder and shaken therein to apply the powder to the base material. Thereafter, the base material with the powder was kept at 500° C. for 10 minutes in the atmosphere to decompose and remove the base material polyurethane foam. Subsequently, the product was kept at 900° C. for 20 minutes in a reducing atmosphere with hydrogen gas flow. As a result, the copper oxide was reduced, the copper powder was sintered, and a copper porous body of 2.1 mm thick was obtained, having such a form that the pattern of polyurethane foam was transferred. Its porosity was 96%.

Example 5

A copper porous body of 2.1 mm thickness was obtained in the same manner as in Example 4 except that, after the copper oxide powder was applied, the steps of immersing in an aqueous copper nitrate solution of 0.5 mol/l in concentration, followed by drying at 100° C. for 30 minutes, were added. Its porosity was 96%.

Example 6

Using a urethane foam of 80 mm×80 mm as the base material, the procedure of Example 5 was repeated to obtain a block-like copper porous body. The porous body had a finish size of 60 mm×60 mm×60 mm, and had a uniform porosity up to the inner part.

Example 7

As the base material, a urethane foam of 1 cm thickness having about 13 holes per inch and a urethane foam of 1 cm thickness having about 40 holes per inch were heat-fused, and a copper porous body was produced in the same manner as in Example 5 to obtain a copper porous body having different porosities in one structure.

Example 8

Using as the base material the same urethane foam as in Example 4 but heat-fused to copper foil 0.2 mm thick, the procedure of Example 2 was repeated to obtain a copper porous body fused to copper foil.

Example 9

As the base material having three-dimensional network structure, a polyurethane foam of 100 mm×100 mm×70 mm was used. This polyurethane foam was immersed in an acrylic type adhesive solution with a resin content of 5%, prepared using methyl ethyl ketone as a solvent, and thereafter the excess solution was removed, to thereby impart stickiness to the surface of the framework of the base material. The resulting base material was dried at 100° C. for 10 minutes to remove the solvent, which was thereafter inserted into nickel carbonyl powder having an average particle diameter of 3 μm and shaken therein to apply the nickel powder to the base material. Thereafter, the base material with the powder was immersed in an aqueous nickel nitrate solution of 1 mol/l in concentration, followed by drying at 100° C. for 30 minutes. The base material thus treated was, with its 100 mm×100 mm face downwards, kept at 500° C. for 10 minutes in the atmosphere to decompose and remove the base material polyurethane foam. The base material shrank to a size of 95 mm×95 mm×65 mm. Subsequently, the product was kept at 1,200° C. for 20 minutes in a reducing atmosphere with hydrogen gas flow. As the result, the nickel powder was sintered, and a block-like nickel porous body was obtained, having such a form that the pattern of polyurethane foam was transferred. The porous body obtained had a size of 80 mm×80 mm×50 mm, and a porosity of 95%.

Example 10

A porous body comprised of an alloy mainly composed of nickel and containing 2% of cobalt was obtained in the same manner as in Example 9 except that, after the nickel carbonyl powder was applied, the base material with the powder was immersed in an aqueous 0.5 mol/l cobalt nitrate solution in place of the aqueous nickel nitrate solution.

Example 11

As the base material having a three-dimensional network structure, a polyurethane foam of 100 mm×100 mm×70 mm was used. This polyurethane foam was immersed in an acrylic type adhesive solution with a resin content of 5%, prepared using methyl ethyl ketone as a solvent, and thereafter the excess solution was removed, to thereby impart stickiness to the surface of the framework of the base material. The resulting base material was dried at 100° C. for 10 minutes to remove the solvent, which was thereafter inserted into aluminum oxide powder having an average particle diameter of 5 μm and shaken therein to apply the aluminum oxide powder to the base material. Thereafter, the base material with the powder was immersed in an aqueous aluminum acetate solution of 1 mol/l in concentration, followed by drying at 100° C. for 30 minutes. The base material thus treated was, with its 100 mm×100 mm face downwards, kept at 1,550° C. for 2 hours in the atmosphere to decompose and remove the base material polyurethane foam, and sinter the aluminum oxide powder. Thus, a block-like aluminum oxide porous body was obtained, having such a form that the pattern of polyurethane foam was transferred. The porous body obtained had a size of 75 mm×75 mm×50 mm, and a porosity of 93%.

Example 12

As the base material having three-dimensional network structure, a net of 400 meshes made of copper was used. This copper net was immersed in an acrylic type adhesive solution with a resin content of 5%, prepared using methyl ethyl ketone as a solvent, and thereafter the excess solution was removed, to thereby impart stickiness to the surface of the framework of the base material. The resulting base material was dried at 100° C. for 10 minutes to remove the solvent, which was thereafter inserted into cooper powder and shaken therein to apply the copper powder to the base material. Thereafter, the base material with the powder was kept at 400° C. for 10 minutes in the atmosphere to decompose and remove the adhesive. Subsequently, the product was kept at 900° C. for 20 minutes in a reducing atmosphere with hydrogen gas flow. As a result, the copper powder was sintered, and a copper porous body having firmly adhered to the cooper net was obtained. The copper net thus obtained has an enlarged surface area and superior antifungal properties, and hence it can be used in water filters or the like.

Example 13

Pulp containing copper oxide powder was made into paper to prepare a sheet of paper having a copper oxide content of 80% by weight and a thickness of 0.5 m, the copper oxide having been applied to the surfaces of pulp fibers. This paper was kept at 900° C. for 20 minutes in an inert atmosphere with nitrogen gas flow. As the result, the copper oxide powder was reduced into copper powder without external addition of reducing gas, by the aid of the reducing gas produced as a result of the decomposition of paper pulp. The reduced copper powder was kept at 900° C. so as to be sintered. Thus, a copper porous body having a porosity of 90% and a thickness of 0.3 mm was obtained. The copper porous body thus obtained can be readily obtained as a thin and large-sized material, and can be used in electromagnetic wave shielding materials.

In the present invention, the sintering of powder is utilized, and hence the powder may be appropriately selected to obtain porous bodies made of metals or ceramics without limitations on materials. The powder is selectively applied to the base material at its portions where the adhesive has been coated. Hence, the portions that may clog the network of the base material do not occur, and a porous body having a good air permeability can be obtained.

The powder is also applied to the base material only on its surface having the adhesive, and hence a certain quantity of the powder can be uniformly applied to the base material, so that a porous body having a great strength can be obtained. Also, since the sintering of powder is utilized, fine irregularities are present on the surface of the framework of the porous body, and the porous body can be made to have a larger specific surface. Hence, those suited for catalyst carriers, cell current collectors, heat exchange members and so forth can be obtained.

The powder, after it has been applied to the base material, may be wetted with the solution containing a metal salt, followed by heating. This makes it possible to stably obtain a porous body with a high porosity, having a three-dimensional form.

The copper porous body obtained by the present invention is used in filters such as heat exchange members, antifungal filters, heat exchange filters, air-purifying filters and fluid-rectifying filters, catalyst carriers for treating automobile exhaust gas or the like, fins for heat dissipation, and so forth.

Figure 1:
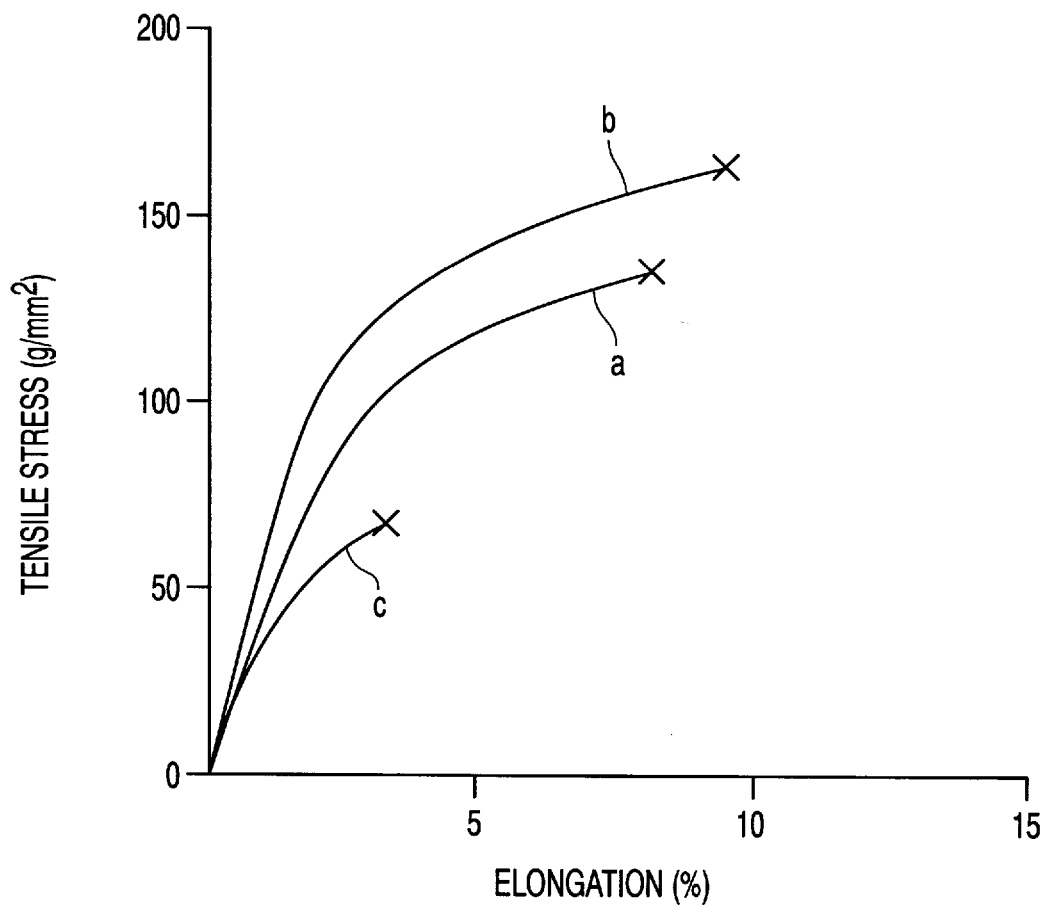
FIG. 1 is a graph showing the relationship between tensile stress and elongation of the porous bodies obtained in Examples and Comparative Example.

We claim:

1. A method for producing a porous body, comprising the steps of directly applying a powder consisting of one or more substance selected from a metal, a metal compound and a ceramic, to the surface of the framework of a three-dimensional network structure serving as a base material, followed by heating;

said three-dimensional network structure being burnt off and removed upon the heating.

2. The method for producing a porous body according to claim 1, wherein stickiness is imparted to the surface of the three-dimensional network structure serving as a base material, and thereafter the powder is directly applied.

3. The method for producing a porous body according to claim 1, wherein the heating comprises removing in an oxidizing atmosphere the three-dimensional network structure serving as a base material.

4. The method for producing a porous body according to any one of claims 1, wherein the heating comprises sintering the powder in a reducing atmosphere.

5. The method for producing a porous body according to claim 1, wherein at lest one of the base material and the powder contains a reducing agent, and the heating is carried out in an inert atmosphere.

6. A method for producing a porous body, comprising directly applying a powder to the surface of the framework of a three-dimensional network structure serving as a base material, and wetting with a liquid the powder thus applied, followed by heating.

7. The method for producing a porous body according to claim 6, wherein the liquid is a solution containing a metal salt.

8. The method for producing a porous body according to claim 7, wherein the metal salt is at least one selected from a nitrate and an organic acid salt.

9. The method for producing a porous body according to claim 1, wherein the powder comprises copper oxide.

10. A method for producing a porous body, comprising steps of directly applying a powder consisting of only a substance which does not disappear upon heating, to the surface of the framework of a three-dimensional network structure serving as a base material, followed by heating;

said three-dimensional network structure being burnt off and removed upon the heating.

11. The method for producing a porous body according to claim 1, wherein the powder is directly applied by shaking the three-dimensional network structure in the powder.

12. The method for producing a porous body according to claim 1, wherein the powder is directly applied by spraying the powder on the three-dimensional network structure.

13. The method for producing a porous body according to claim 6, wherein the powder comprises copper oxide.

14. The method for producing a porous body according to claim 6, wherein the powder is directly applied by shaking the three-dimensional network structure in the powder.

15. The method for producing a porous body according to claim 6, wherein the powder is directly applied by spraying the powder on the three-dimensional network structure.

16. The method for producing a porous body according to claim 10, wherein the powder comprises copper oxide.

17. The method for producing a porous body according to claim 10, wherein the powder is directly applied by shaking the three-dimensional network structure in the powder.

18. The method for producing a porous body according to claim 10, wherein the powder is directly applied by spraying the powder on the three-dimensional network structure.

* * * * *